United States Patent [19]

Morris

[11] Patent Number: 4,850,259

[45] Date of Patent: Jul. 25, 1989

[54] POWDER DOSING APPARATUS

[75] Inventor: James P. Morris, Severn Stoke, England

[73] Assignee: Eley Limited, Birmingham, England

[21] Appl. No.: 269,114

[22] Filed: Nov. 9, 1988

[51] Int. Cl.⁴ ............ F42B 33/02; F42B 33/04; B65B 43/42; B67C 3/00

[52] U.S. Cl. .......................... 86/31; 86/29; 86/32; 86/33; 141/129; 141/237; 222/161

[58] Field of Search ............. 86/31, 33, 32, 29, 1.1; 141/129, 181, 237, 242; 222/161

[56] References Cited

U.S. PATENT DOCUMENTS

| | | | |
|---|---|---|---|
| 200,846 | 3/1878 | Schenck | 86/31 |
| 203,967 | 5/1878 | Watkeys | 86/31 |
| 506,425 | 10/1893 | Elliott | 86/31 |
| 747,422 | 12/1903 | Helm | 86/31 |
| 3,656,517 | 4/1972 | Taylor et al. | 86/31 |
| 3,656,518 | 4/1972 | Aronson | 86/31 |
| 4,629,093 | 12/1986 | Le Molaire | 86/31 |

Primary Examiner—Howard J. Locker
Attorney, Agent, or Firm—Cushman, Darby & Cushman

[57] ABSTRACT

A powder dosing apparatus, especially for use in the priming of ammunition, comprises a tray containing a uniformly thick layer of powder and a dosing assembly arranged to extract a plurality of doses of powder from the tray. After extraction of the doses the assembly is moved to an adjacent station where it ejects the doses into respective receptacles, such as capshells. During ejection, the powder in the tray is replenished from a chute and the layer is raked and levelled by an assembly comprising a rake and doctor blades in readiness for a subsequent dose extraction step.

9 Claims, 2 Drawing Sheets

POWDER DOSING APPARATUS

BACKGROUND OF THE INVENTION

This invention is concerned with powder dosing apparatus especially, but not exclusively, for use in the priming of explosive devices, for example centrefire or rimfire cartridges.

In our published UK patent specification No. 1569874 we describe and claim a method of priming a plurality of explosive devices which, in its preferred form, includes the steps of dosing a quantity of a substantially dry powdery "premix" into an element, eg. a centrefire capshell or rimfire case, of each device, followed by dosing a quantity of a liquid reaction medium, typically water, into the elements so as to form, in situ, a quantity of moist primer in each element. The moist primer is subsequently dried. More particularly, the premix is a relatively insensitive mixture (relative, that is, to the resulting primer) comprising at least two compounds that will, in the presence of a liquid reaction medium, react together forming a primary explosive compound and further comprising other conventional ingredients of a primer, the compounds and ingredients being present in predetermined proportions. Thus, upon addition of the liquid reaction medium, the two (or more, if appropriate) compounds react together forming the primary explosive compound in admixture with the further ingredients present in the premix. By way of example, a typical premix for use in priming rimfire cartridges comprises, in predetermined proportions, lead monoxide, styphnic acid, a sensitiser such as tetrazene, an oxidiser such as barium nitrate and a frictionator such as glass. A typical primix for use in priming centrefire cartridges, for example shotgun cartridges, in which the primary is contained in a capshell, may comprise lead monoxide, styphnic acid, a sensitizer such as tetrazene, oxidisers such as barium nitrate and lead dioxide, and fuels such as calcium silicide and antimony sulphide. In both cases, the lead monoxide and styphnic acid react together, in the presence of water as the reaction medium, to yield the primary explosive compound, lead styphate, whilst the other ingredients retain their identity in the final primer.

The method described above is relatively safe compared to conventional priming methods since it avoids the need to store and handle the primary explosive compound, such as lead styphate, and mixtures containing it, in bulk. Because of this, the method is suited to full automation. Hitherto, we have dosed the powdery premix, from bulk quantities thereof, simultaneously into a large number of capshells or cases using conventional priming plate techniques. Whilst this has proved satisfactory, it is difficult to guarantee that the correct quantity of premix will be dosed into each and every capshell or case as is necessary if eventual "misfires" are to be avoided.

SUMMARY OF THE INVENTION

It is an object of the present invention to provide improved apparatus for dosing the dry premix, and in particular such apparatus the operation of which can be readily automated and is reliable, especially as regards consistency of dosing.

According to the present invention there is provided powder dosing apparatus comprising:

(a) a first, horizontal tray for containing said powder in the form of a continuous layer of substantially uniform pre-determined thickness, (b) support means adjacent to said tray for horizontally supporting a second tray containing an array of receptacles, for example rimfire cases or centrefire capshells, into which the powder is to be dosed, (c) dosing means supported generally above the level of the first tray and of the support means and comprising a corresponding array of vertically disposed tubular members open at their respective lower ends and each having a piston slidably mounted therein, the dosing means being movable alternately between a first position above the first tray and a second position above the second tray, in which second position the open ends of the tubular members are in register with the receptacles, (d) means to lower and to raise the tubular members, when the dosing means is in its first position, into and out of the first tray whereby part of the bore of each tubular member becomes filled with, and extracts from, the powder layer a slug of a pre-determined quantity of powder, (e) means to lower the piston within each tubular member, when the dosing means is in its second position, so as to eject each slug of powder into the receptacle below it, (f) means for moving the second tray from the support means, after the receptacles thereon have received the slugs of powder, (g) means for successively feeding further second trays and receptacles onto the support means for receiving, in turn, slugs of powder and, (h) feed means, rake means and levelling means operative, when the dosing means is in its second position, to feed powder onto the tray and to rake and level the powder, respectively, so as to ensure that, in advance of each slug extraction step, the layer is continuous and of said substantially uniform pre-determined thickness.

BRIEF DESCRIPTION OF THE DRAWINGS

Apparatus constructed in accordance with the invention mentioned will now be described in more detail, by way of example only, with reference to the accompanying drawings in which.

DESCRIPTION OF THE PREFERRED EMBODIMENTS

Figure 1:
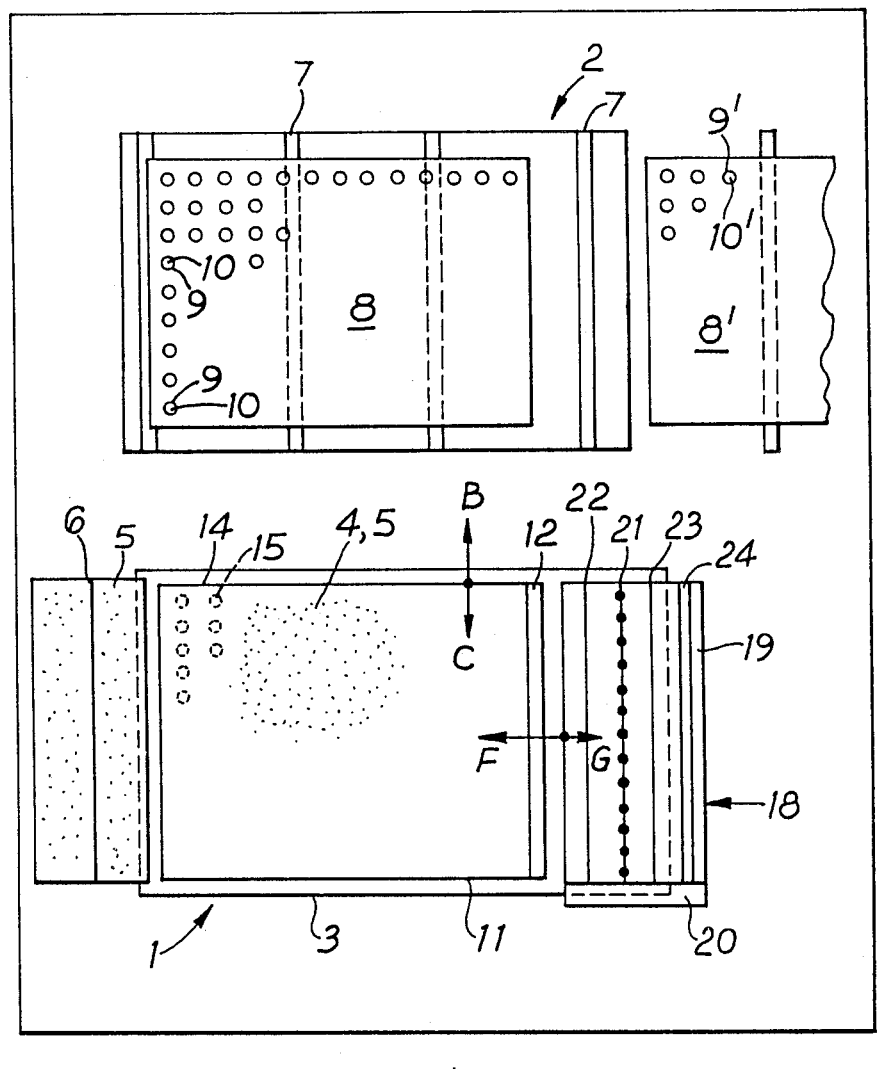
FIG. 1 is a diagrammatic plan view of the apparatus during slug extraction from the powder layer.

Referring to FIG. 1 of the drawings, the apparatus includes two stations designated generally by reference numerals 1 and 2 respectively.

The station 1 comprises a horizontally supported tray 3 containing a continuous, uniformly thick layer 4 of a powdery premix 5 of the type described earlier. A vibratory chute 6 is located above, and at one end of, the tray 3 and serves continually to replenish premix 5 in the tray 3 as is described in more detail below.

The second station 2, which is adjacent to and approximately on the same level as the station 1, comprises a number of support rollers 7 for horizontally supporting a tray 8 formed with an array of holes 9 each containing, in an upright position, an empty centrefire capshell 10. By way of example, each tray may hold 504 caps in an array of eighteen columns and twenty eight rows.

Figure 2:
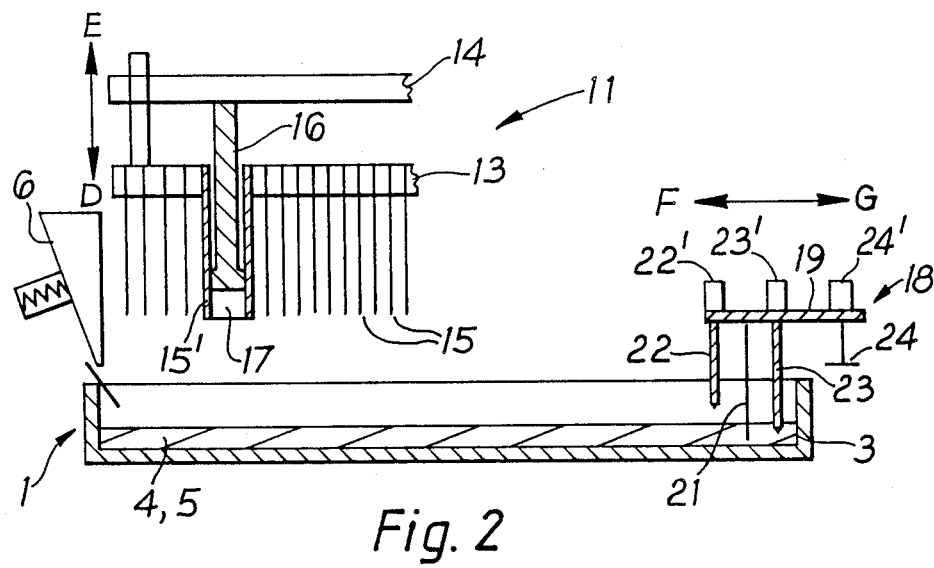
FIG. 2 is a diagrammatic side elevation, partly in section, of the apparatus of FIG. 1 as seen in the direction of arrow A also during the slug extraction step.

Located generally above the levels of the stations 1 and 2 is a powder dosing assembly 11 supported on a reciprocable carriage 12. This comprises (with additional reference to FIG. 2) a pair of horizontal plates 13, 14 in spaced parallel relationship with one another. The lower plate 13 supports an array of tubes 15, one of which is shown in enlarged detail at 15', the lower end of each of which is open; in the example cited above, there would be 504 such tubes arranged in an array corresponding to the array of holes 9 in the tray 8. The upper plate 14, which is reciprocable vertically relative to the plate 13, supports a corresponding array of pistons, one of which is shown at 16, each slidably engaged in its associated tube 15. During the powder slug extraction step, which is described in more detail below, the upper plate 14 and, therefore, the pistons 16 are maintained in their uppermost position as shown in FIG. 2, whereby a cavity 17 of pre-determined volume is afforded at the lower end of each tube 15. On the other hand, during the slug ejection step, which also is described in more detail below, the upper plate 14 and therefore the pistons 16 are lowered relative to plate 13 whereby the pistons eject the slugs of premix 5 onto the capshells 10.

The arrangement 11 is reciprocable, on its carriage 12, as shown by the double arrow BC alternately between two positions in one of which (the "first" position) it is above the tray 3 as shown in FIGS. 1 and 2 and in the other of which (the "second" position) it is above the tray 8 (FIG. 3) with the tubes 15 in register with the capshells 10. The arrangement 11 is also as a whole vertically reciprocable as shown by the double arrow DE (FIG. 2).

The apparatus further includes a premix raking and levelling assembly 18 which is horizontally reciprocable in the directions shown by the double arrow FG. The assembly 18 comprises a horizontal plate 19 mounted on a carriage 20 from which depend vertically a comb 21, a pair of doctor blades 22,23 and a level sensor 24, all of which extend substantially across the whole width of the tray 3. The doctor blades 22 and 23 and the level sensor 24 are brought into and out of an operative position, as is described below, by means of pneumatic cylinders 22', 23' and 24' respectively.

The apparatus operates as follows: At start up, the various parts of the apparautus described above are at the positions shown in FIGS. 1 and 2, the assembly 11 in particular being in its first position. Then, the assembly 11 as a whole is lowered in the direction of arrow D whereby the lower ends of the tubes 15 are pressed into the layer 4 of premix 5. By way of example, with a layer 4 thickness of about 12 mm and a cavity 17 depth of about 5 mm, the assembly 11 is lowered until the ends of the tubes 15 are within about 0.1 mm of the base of the tray 3 whereby the cavity 17 of each tube 15 becomes filled with a slug of slightly compressed premix 5.

The assembly 11 is then raised in the direction of arrow E. It is then moved, in the direction of arrow B, until it reaches its second position in which it is above the tray 8 with the tubes 15 in register with the capshells 10. Upper plate 14 of assembly 11 is then moved downwards relative to the lower plate 13 whereby the pistons 16 eject the slugs of premix 5 present in the cavities 17 into the empty capshells 10. After ejection of the slugs of premix 5, the upper plate 14 is moved upwards whereby pistons 16 are retracted to their original positions.

Figure 3:
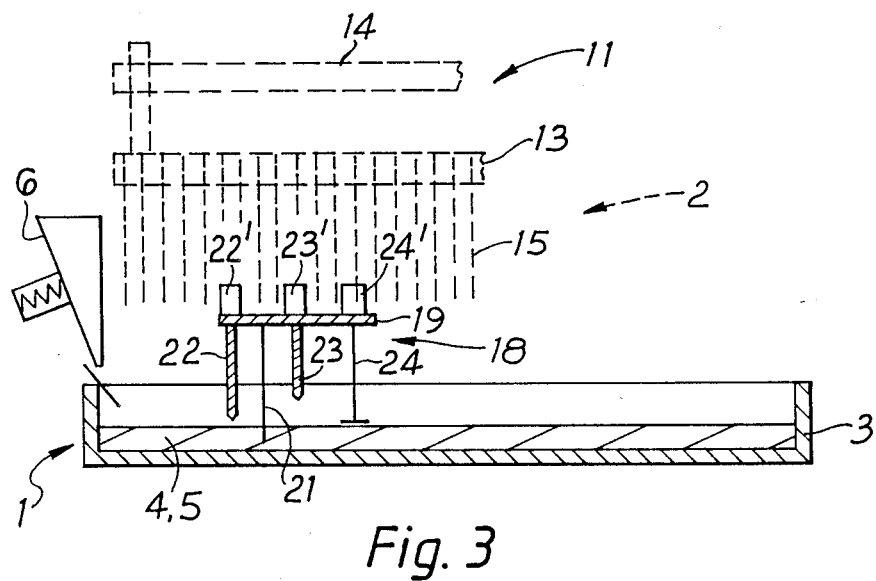
FIG. 3 is a similar view to that of FIG. 2 but during slug ejection/powder replenishment, raking and levelling.

More or less simultaneously with slug ejection, the chute 6 is vibrated whereby an amount of premix 5, approximating to the amount removed in the slug extraction step, is fed onto the tray 3. The raking and levelling assembly 18 is more or less simultaneously brought into operation. More particularly, the assembly 18 is first moved in the direction of affow F with the doctor blade 22 in a raised, inoperative position, but with the doctor blade 23 in a lowered operative position (as shown in FIG. 3) whereby the latter contacts and levels the layer 4 of premix 5. In advance of levelling, the comb 21 rakes the premix 5 and, in particular, serves to distribute premix 5 into the cavities left in the layer 4 after the slug extraction step. When the assembly 18 has traversed the whole of the layer 4, its direction of movement is reversed and it returns to its original position travelling in the direction of arrow G. During that travel, however, and as shown in FIG. 3 the respective modes of the doctor blades 22 and 23 are reversed such that only the blade 22 performs a levelling operation, at the same time spreading out the fresh amount of premix 5 fed onto the tray 3 from the chute 6. During movement of the assembly 18, the level sensor 24 is brought into an operative position to ensure that the level of the layer 4 is correct. In the event of a shortfall, the sensor 24 causes the chute 6 to deliver further premix 5 onto the tray 3 and a further raking and levelling operation is effected. When the assembly 18 has returned to its original position, the apparatus is ready to perform a further slug extraction/ejection/powder replenishment/levelling cycle. For that purpose the assembly 11 is returned to its first position and the tray 8, together with the charged capshells 10, is conveyed from the station 2 for further processing and a further tray 8' (see FIG. 1) filled with empty capshells 10' is fed to the station 2. The above cycles are thereafter repeated for so long as desired.

Movement of the various items described above may conveniently be effected by means of pneumatic devices, the operation of which may, as will be appreciated, be readily automated using microprocessor sequence controllers.

Whilst the above specific description refers to the dosing of powdery premixes in the priming of centrefire capshells, it will be appreciated that the apparatus could be used in the priming of other devices such as rimfire cartridges and indeed could be used for dosing powdered materials in a variety of other contexts.

I claim:
1. Powder dosing apparatus comprising:
(a) a first, horizontal, tray for containing said powder in the form of a continuous layer of substantially uniform pre-determined thickness;
(b) support means adjacent to said tray for horizontally supporting a second tray containing an array of receptacles in which the powder is to be dosed;
(c) dosing means supported generally above the level of the first tray and the support means and comprising a corresponding array of vertically disposed tubular members open at their respective lower ends and each having a piston slidably mounted therein, the dosing means being movable alternately between a first position above the first tray and a second position above the second tray, in which second position the open ends of the tubular members are in register with the receptacles;

(d) means to lower and to raise the tubular members when the dosing means is in its first position into and out of the first tray wherby part of the bore of each tubular member becomes filled with, and extracts from, the powder layer, a slug of a predetermined quantity of the powder;

(e) means to lower the piston within each tubular member, when the dosing means is in its second position, so as to eject each slug of powder into the receptacle below it;

(f) means for moving the second tray from the support means after the receptacles thereon have received the slugs of powder;

(g) means for successively feeding further second trays and receptacles onto the support means for receiving, in turn, slugs of powder, and;

(h) feed means, rake means and levelling means operative, when the dosing means is in its second position, to feed power onto the first tray and to rake and level the powder, respectively, so as to ensure that, in advance of each slug extraction step, the layer is continuous and of said substantially uniform predetermined thickness.

2. Apparatus according to claim 1 wherein the support means serves to support a second tray containing, in an upright position, an array of ammunition rimfire cases or centerfire shells.

3. Apparatus according to claim 1 wherein the dosing means comprises an assembly of a lower horizontal plate and an upper horizontal plate in spaced parallel relationship with one another, the lower plate supporting said array of tubular members and the upper plate supporting a corresponding array of pistons, the upper plate being reciprocable vertically relative to the lower plate from an uppermost position in which the lower end portion of each tubular member and the end of its piston defines a cavity of predetermined volume, to a lower, powder slug ejection position, the assembly as a whole being vertically reciprocable, when the dosing means is in its first position above the first tray and with the upper plate in its uppermost position whereby each cavity will become filled with said pre-determined quantity of powder when the assembly is lowered into the first tray.

4. Apparatus according to claim 1 wherein the feed means comprises a vibratory chute located above and at one end of the first tray, said chute being adapted to feed onto the first tray a quantity of powder substantially corresponding to the total amount of powder removed during each powder slug extraction step.

5. Apparatus according to claim 1 wherein the rake means comprises a comb-like member adapted to distribute powder into the cavities left in the layer thereof after the slug extraction step.

6. Appartatus as claimed in claim 1 wherein the levelling means comprises one or more doctor blades.

7. Apparatus as claimed in claim 1 wherein the rake means and the levelling means are comprised in an assembly that is reciprocable over the first tray.

8. Apparatus as claimed in claim 1 further comprising a sensor for periodically sensing the level of powder in the first tray, the sensor causing the feed means to feed additional powder onto the first tray in the event that said level falls below a pre-determined one.

9. Ammunition priming apparatus including apparatus as claimed in claim 1.

* * * * *